United States Patent Office 3,524,720
Patented Aug. 18, 1970

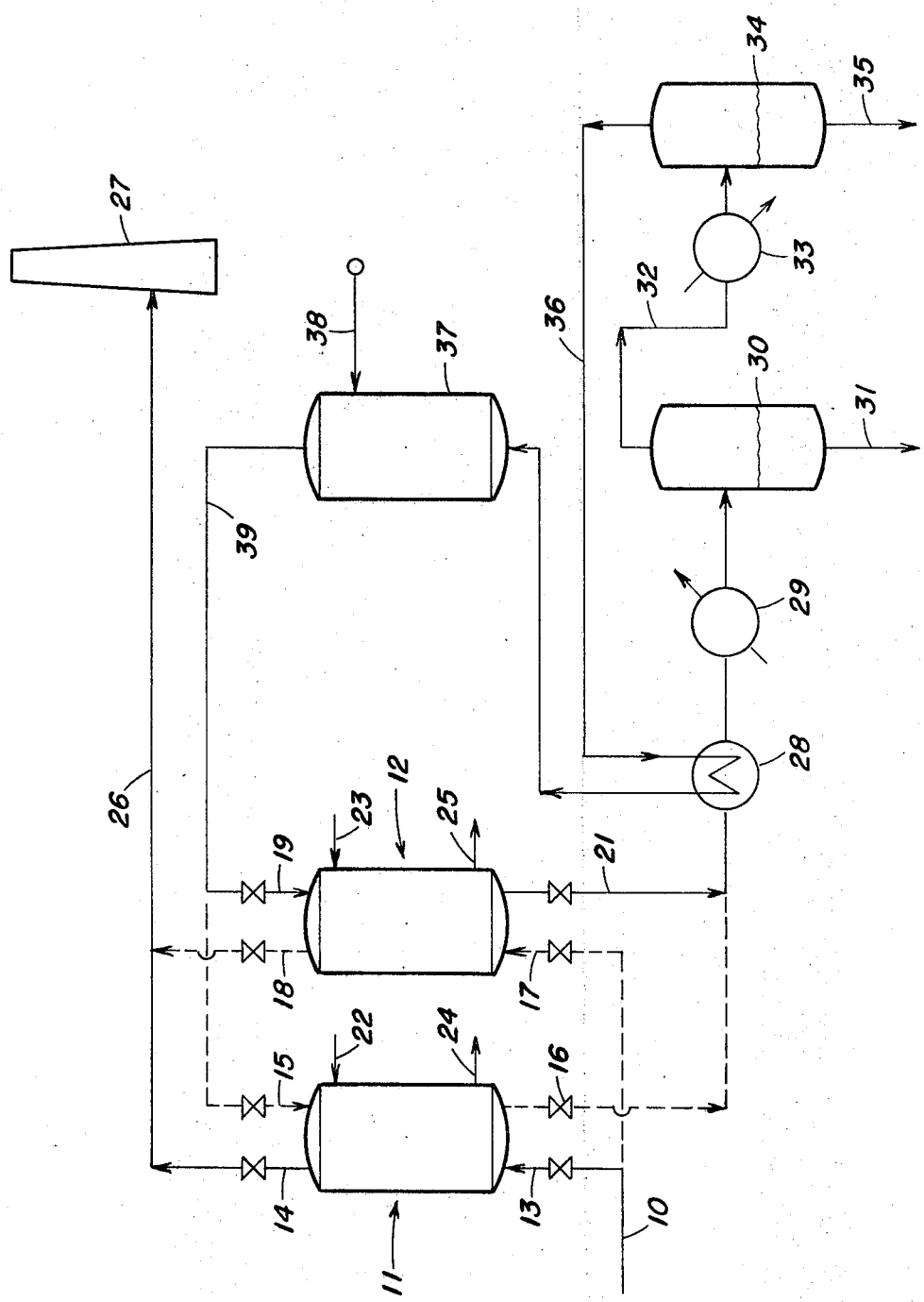

3,524,720
PROCESS FOR REMOVING SULFUR DIOXIDE FROM GASES
William V. Bauer, New York, N.Y., assignor to The Lummus Company, New York, N.Y., a corporation of Delaware
Filed Apr. 24, 1967, Ser. No. 632,548
Int. Cl. B01d 53/04, 53/34
U.S. Cl. 23—2            11 Claims

ABSTRACT OF THE DISCLOSURE

A process for removing sulfur dioxide from a gaseous stream wherein the gaseous stream is passed through a bed of sodium carbonate, resulting in reaction between the sulfur dioxide and carbonate to produce sodium sulfite. The bed is periodically regenerated by passing a stream of carbon monoxide therethrough, resulting in the production of solid sodium carbonate and a gaseous stream, containing sulfur and carbon dioxide. The sulfur values are recovered, and the carbon dioxide reacted with free carbon to produce carbon monoxide for the regeneration cycle.

---

This invention relates to the removal of sulfur oxides from a gaseous stream, and more particularly to a process for removing the oxides of sulfur, in particular sulfur dioxide, from a waste gas, such as a flue gas.

Sulfur dioxide in a constituent of many gases, such as smelter gases, flue gases, off gases from chemical processes and stack gases from coal-burning furnaces. These gases may also contain quantities of sulfur trioxide. These sulfur oxides, even though present in low concentrations, contaminate the atmosphere and in order to prevent adverse effects on human life, plant life, building materials, etc., must be removed before releasing such gases to the atmosphere.

Many processes have been derived for removing sulfur dioxide from such gases, including absorption techniques, but many of these processes are not particularly effective for removing low concentrations of sulfur dioxide, and do not provide for the recovery of sulfur values, and the regeneration of the absorption material.

Accordingly, an object of this invention is to provide an effective process for removing sulfur oxides from a gaseous stream.

Another object of this invention is to provide a process for removing low concentrations of sulfur oxides from a gaseous stream.

A further object of this invention is to provide a process for absorbing sulfur oxides from a gaseous stream and for regenerating the absorbent.

Still another object of this invention is to provide a process for removing sulfur oxides from a gaseous stream wherein sulfur values are recovered.

These and other objects will become more readily apparent from the following detailed description of the invention when read with reference to the accompanying drawing wherein:

The drawing is a schematic flow diagram of an embodiment of the process of the invention.

Briefly, the objects of this invention are accomplished by removing sulfur dioxide from a gaseous stream by reaction with a metal carbonate, such as an alkali metal, alkaline earth metal or zinc carbonate, to produce the corresponding sulfite. The sulfite is then reduced with carbon monoxide to regenerate the carbonate, to recover sulfur values and to produce carbon dioxide. Carbon dioxide may then be reacted with a free carbon containing material to regenerate the carbon monoxide.

More particularly, a sulfur dioxide containing gaseous stream, such as a flue gas, is contacted with preferably either an alkali metal carbonate, an alkaline earth metal carbonate or a mixture of such carbonates, at a temperature of between about 50° and about 1500° F., preferably between about 250° and about 1000° F., to produce the corresponding alkali metal or alkaline earth metal sulfite. Sulfur trioxide present in the gas reacts with the carbonate to produce the corresponding sulfate. The carbonate is preferably sodium or calcium carbonate, or dolomite, a natural calcium-magnesium carbonate; and the reactions may be represented by the following Equations 1 and 2, using sodium carbonate as an example:

(1)      $Na_2CO_3 + SO_2 \rightarrow Na_2SO_3 + CO_2$
(2)      $Na_2CO_3 + SO_3 \rightarrow Na_2SO_4 + CO_2$ The carbonate may be directly added to the gaseous stream as a finely divided powder, or the gaseous stream may be passed through either a fixed, moving, or fluidized bed of the carbonate. In the case where the carbonate is added to the gas, it is preferred that the carbonate be added in an amount greater than the stoichiometric amount, preferably about 2 times the stoichiometric amount. When the gaseous stream is the result of combustion of a sulfur-containing fuel, the stoichiometric amount may be readily calculated from the quantity of sulfur in the fuel. In the case where the gaseous stream is passed through a bed of the carbonate, the bed is periodically regenerated so that there is always a stoichiometric excess of the carbonate to effect chemical absorption of sulfur dioxide.

The alkali metal or alkaline earth metal sulfite produced in accordance with Equation 1 above may be converted to the corresponding carbonate by reduction with carbon monoxide at a temperature of between about 800° and 2000° F., preferably between about 1000° and about 1800° F. Such reduction is represented by the following Equation 3, using sodium sulfite as an example:

(3)      $Na_2SO_3 + 2CO_{(g)} \rightarrow Na_2CO_3 + CO_{2(g)} + S_{(g)}$

If desired the reaction rate may be improved by the addition of a catalyst, e.g., iron, copper or other carbonyl forming metals. The sulfates, if present, may be reduced to the corresponding sulfides, as represented by the following Equation 4:

(4)      $Na_2SO_4 + 4CO \rightarrow Na_2S + 4CO_2$

The carbon monoxide employed for regenerating the carbonate may be produced by reacting carbon dioxide with a free carbon containing material, e.g., coal, coke and the like, at a temperature of between about 1200 and about 1700° F. The carbonaceous material may be employed as a fluidized bed to increase reaction rate.

The invention will be described in further detail with reference to an embodiment of the invention schematically illustrated in the accompanying drawing. The conditions utilized are those hereinabove more fully described. Associated equipments, such as pumps, fans, valves, and the like have been omitted to facilitate an understanding of the invention.

Referring to the drawing, a gaseous stream, such as flue gas from a power plant (not shown), containing sulfur dioxide and some sulfur trioxide (after removal of a major portion of fly ash and the like) in line 10, is introduced into either absorber 11 or 12.

The absorbers 11 and 12 are alternately operated to effect chemical absorption of the sulfur oxides and regeneration of the absorbent material, respectively, and thus, while chemical absorption is being effected in one absorber, regeneration is being effected in the other absorber. The absorber 11 is provided with lines 13 and 14 for introducing and withdrawing a waste gas to be treated, and lines 15 and 16 for connecting absorber 11 to the regeneration cycle. Similarly, absorber 12 is provided with lines 17 and 18 for introducing and withdrawing a waste gas to be treated, and lines 19 and 21 for connecting absorber 12 to the regeneration cycle. The absorbers 11 and 12 are also provided with lines 22 and 23, respectively, for introducing make-up absorbent and lines 24 and 25, respectively, for purging solids from the absorber. It is to be understood that an absorber in which absorption is being effected is connected to the regeneration cycle when the absorbent material is depleted beyond a predetermined minimum and at this time the other absorber is removed from the regeneration cycle and employed for removing sulfur oxides from the gaseous stream. As an alternative, the functions of the absorbers can be automatically switched after a predetermined period of time has passed. It is also to be understood that the regeneration cycle is generally effected at a higher temperature than the absorption cycle and consequently, the solids must be preheated between the absorption and regeneration cycle and cooled between the regeneration and absorption cycle. Accordingly, at the completion of the absorption cycle, the solids in absorber 11 may be contacted with a hot gas introduced, for example, through line 22 to raise the temperature thereof to the regeneration temperature prior to initiating the regeneration cycle. Similarly, at the completion of the regeneration cycle, the solids in absorber 12 may be contacted with a cool gas introduced, for example, through line 23, to lower the temperature thereof to the absorption temperature, prior to initiating the absorption cycle.

For the purposes of describing the embodiment depicted in the drawing, it will be assumed that absorption is being effected in absorber 11 and regeneration in absorber 12.

The flue gas in line 10 is introduced into absorber 11, containing a metal carbonate absorbent, such as sodium carbonate, through line 13. The sulfur dioxide and sulfur trioxide in the flue gas react with the sodium carbonate to produce sodium sulfite and sodium sulfate, respectively. Flue gas, essentially free of sulfur dioxide and trioxide, is withdrawn from absorber 11 through line 14 and passed through line 26 to a stack 27 for release to the atmosphere or to further heat recovery equipment.

In absorber 12 wherein regeneration of sodium carbonate is being effected, the sodium sulfite contained therein is reacted with carbon monoxide introduced through line 19 to produce sodium carbonate, carbon dioxide and sulfur vapor. The sodium sulfate is correspondingly reduced by the carbon monoxide to sodium sulfide. Solids are periodically purged from absorber 12 through line 25 to prevent a buildup of fly ash and sulfides and make-up carbonate is introduced therein through line 23.

A gaseous effluent, containing carbon dioxide and gaseous sulfur, is withdrawn from the absorber 12 through line 21, passed through heat exchangers 28 and 29 to effect cooling thereof to a temperature at which sulfur condenses, and introduced into separator 30 to recover elemental sulfur in molten form. The sulfur is withdrawn from separator 30 through line 31. A gaseous effluent is withdrawn from separator 30 through line 32, passed through heat exchanger 33 to effect further cooling thereof, and introduced into separator 34 to recover additional sulfur in molten form which is withdrawn through line 35.

A gaseous effluent containing carbon dioxide, is withdrawn from separator 34 through line 36, passed through heat exchanger 28 to indirectly cool the carbon dioxide and sulfur passing therethrough and introduced into a reactor 37. The carbon dioxide introduced into reactor 37 is reacted with a carbonaceous material, such as coal or coke, introduced through line 38 to produce carbon monoxide. The carbon monoxide is withdrawn from reactor 37 through line 39, and introduced into absorber 12 to effect regeneration of carbonate.

Numerous modifications of the invention are possible without departing from the scope of the invention. Thus, for example, in removing the sulfur dioxide from a power plant flue gas employing liquid fuels, instead of coal, a portion of the liquid fuel may be used to generate synthesis gas which is then used to regenerate carbonate by reducing the corresponding sulfite.

As another modification, a gaseous stream, containing sulfur dioxide, can be passed continuously through one zone and a gaseous stream, containing carbon monoxide, can be passed continuously through another zone, with the metal carbonate being continuously circulated between the zones thereby effecting absorption of sulfur dioxide in one zone and regeneration of the metal carbonate in the other zone.

These modifications and many other modifications should be readily apparent to those skilled in the art from the teachings of this invention.

The following illustrates a specific embodiment of the invention, but the scope of the invention is not to be limited thereby:

EXAMPLE

This example illustrates removal of sulfur dioxide from a flue gas obtained from a furnace, burning No. 6 fuel oil having the following composition:

| Component | Flow rate, lb./hr. | Wt. percent |
|---|---|---|
| $CO_2$ | 1,209,000 | 21.40 |
| $H_2O$ | 380,000 | 6.73 |
| $SO_2$ | 21,000 | 0.37 |
| Others | 4,030,000 | 71.50 |
| | 5,640,000 | 100.00 |

The process will be described with reference to a complete absorption-regeneration cycle in absorber 11. The flue gas withdrawn from the furnce is at a temperature of 800° F. and is introduced into absorber 11, containing 415,000 lbs. of limestone. The limestone contains about 0.25% by weight, of cupric chloride which was sprayed onto the limestone prior to the introduction into absorber 11. The effluent withdrawn from absorber 11 through line 14, initially contains about 0.01% sulfur dioxide and after eight hours of operation, contains about 0.025% sulfur dioxide, representing sulfur dioxide removal at a 95% average. After the completion of the eight-hour period, about 60% of the limestone has reacted to produce sodium sulfite.

The flue gas is then diverted to absorber 12 and absorber 11 is connected to the regeneration cycle. The solids in absorber 11 are initially heated to a temperature of about 1500° F. by the introduction of a hot flue gas, obtained by the combustion of a light gaseous or liquid fuel with a deficiency of air through line 22. At this temperature, the solids are contacted with a gaseous stream containing about 90–95% carbon monoxide, introduced through line 15 at a temperature of 1550° F., and a flow rate, based on carbon monoxide, of 70,000 lbs./hr. As a result of the contact, about 50% of the carbon monoxide reacts with the calcium sulfite to produce calcium carbonate, sulfur and carbon dioxide. In addition, COS and calcium sulfide are produced as by-products.

A gaseous effluent, containing carbon monoxide, carbon dioxide, gaseous sulfur and some COS is withdrawn from absorber 11 through line 16 at the rate of about 82,500 lbs./hr. The gas is passed through heat exchangers 28 and 29 and cooled to a temperature of about 325° F. at which temperature sulfur condenses. The gas containing liquid sulfur is introduced into separator 30 wherein about 19,000 lbs./hr. of sulfur are recovered. The gas withdrawn from separator 30 is further cooled in heat exchanger 33 and introduced into separator 34 wherein an additional 1000 lbs./hr. of molten sulfur are recovered.

The gaseous effluent withdrawn from separator 34 containing about equal amounts of carbon monoxide and carbon dioxide is compressed, passed through heat exchanger 28 wherein the temperature is raised to about 1300° F., and introduced into reactor 37. Reactor 37 contains a fluidized bed of coke and is maintained at a temperature of about 1550° F. by electric heating. As a result of the contact between the fluidized coke and the carbon dioxide, a gaseous stream primarily comprised of carbon monoxide is withdrawn from reactor 37 through line 39 for use in the regeneration cycle.

The regeneration of the limestone in absorber 11 is effected over a four-hour period and at the end of such period the solids contained therein are contacted with air, introduced through line 22 at a rate of 200,000 lbs./ hr. to cool the solids to a temperature of 900° F. to prepare of the absorption cycle. As a result of such contact with air some of the calcium sulfide is converted to calcium sulfate.

The process of this invention is extremely effective for removing sulfur oxides from a gaseous stream especially when the sulfur oxides are present in low concentrations, for example, as low as .15%. The process is economical in that the sulfur oxide absorbent is regenerated and sulfur values are recovered.

Many modifications of the present invention are possible in light of the above teachings. Therefore, it is to be understood that within the scope of the appended claims, the invention may be practiced otherwise than as specifically described.

What is claimed is:

1. A process for treating a gas containing sulfur dioxide comprising:
    (a) reacting the sulfur dioxide in the gas stream with a solid metal carbonate selected from the group consisting of alkali metal, alkaline earth metal and zinc carbonates to produce the corresponding solid metal sulfite;
    (b) recovering an essentially sulfur dioxide free gas stream from the solid metal sulfite;
    (c) reducing the solid metal sulfite with carbon monoxide to regenerate the metal carbonate for step (a) and produce carbon dioxide and sulfur; and
    (d) separating the carbon dioxide, sulfur and metal carbonate.

2. The process of claim 1 wherein the carbon dioxide is reacted with carbon to produce carbon monoxide for step (c).

3. The process of claim 2 wherein step (a) is effected at a temperature between about 250° and about 1000° F.

4. The process of claim 3 wherein step (c) is effected at a temperature between about 1000° F. and about 1800° F.

5. The process of claim 4 wherein the gas also contains sulfur trioxide, said sulfur trioxide reacting with the metal carbonate in step (a) to produce a solid metal sulfate, the solid metal sulfate being reduced by the carbon monoxide in step (c) to a solid metal sulfide.

6. The process of claim 4 wherein the gas is passed through a fixed bed of solid metal carbonate.

7. The process of claim 4 wherein the metal carbonate is sodium carbonate.

8. The process of claim 4 wherein the metal carbonate is calcium carbonate.

9. The process of claim 4 wherein the metal carbonate is dolomite.

10. A process for treating a gaseous stream, containing sulfur dioxide, comprising:
    (a) passing the gaseous stream for a period of time through a bed containing a solid metal carbonate, said metal being selected from the group consisting of alkali and alkaline earth metals, said gaseous stream being contacted with the bed at a temperature between about 50° and about 1500° F., said sulfur dioxide reacting with the metal carbonate to produce the corresponding solid metal sulfite;
    (b) recovering the gaseous stream from the bed essentially free of sulfur dioxide;
    (c) passing a gaseous stream, containing carbon monoxide, through the bed subsequent to steps (a) and (b), said gaseous stream being contacted with the bed at a temperature between about 800° and about 2000° F., the carbon monoxide reacting with the solid metal sulfite to produce carbon dioxide and gaseous sulfur;
    (d) withdrawing a gaseous stream, containing sulfur and carbon dioxide, from the bed and cooling the stream to effect condensation of the sulfur;
    (e) separating the sulfur from the gaseous stream;
    (f) reacting the carbon dioxide in the gaseous stream with carbon at a temperature between about 1200° and about 1700° F. to produce carbon monoxide; and
    (g) passing the carbon monoxide to step (c).

11. The process of claim 10 wherein there is more than one bed and steps (a) and (b) are effected in at least one bed and steps (c), (d), (e), (f), and (g) are effected in at least one bed.

References Cited

UNITED STATES PATENTS

| | | | |
|---|---|---|---|
| 2,090,828 | 8/1937 | Beckman | 23—2 |
| 2,718,453 | 9/1955 | Beckman | 23—2 |
| 3,401,010 | 9/1968 | Guerrieri | 23—63 |

OSCAR R. VERTIZ, Primary Examiner

E. C. THOMAS, Assistant Examiner

U.S. Cl. X.R.

23—61, 63, 66, 129, 150, 224